(12) United States Patent
Bouillet et al.

(10) Patent No.: US 8,237,494 B2
(45) Date of Patent: Aug. 7, 2012

(54) APPARATUS AND METHOD FOR DETERMINATION OF SIGNAL FORMAT

(75) Inventors: Aaron Reel Bouillet, Noblesville, IN (US); Mark Francis Rumreich, Indianapolis, IN (US)

(73) Assignee: Thomson Licensing, Boulogne (FR)

( * ) Notice: Subject to any disclaimer, the term of this patent is extended or adjusted under 35 U.S.C. 154(b) by 41 days.

(21) Appl. No.: 12/737,028

(22) PCT Filed: Jun. 3, 2009

(86) PCT No.: PCT/US2009/046080
§ 371 (c)(1),
(2), (4) Date: Dec. 2, 2010

(87) PCT Pub. No.: WO2009/155134
PCT Pub. Date: Dec. 23, 2009

(65) Prior Publication Data
US 2011/0074500 A1 Mar. 31, 2011

Related U.S. Application Data

(60) Provisional application No. 61/130,911, filed on Jun. 3, 2008.

(51) Int. Cl.
*H03D 3/00* (2006.01)

(52) U.S. Cl. ......... 329/304; 329/310; 375/340; 375/343

(58) Field of Classification Search .................. 329/304, 329/310; 375/340, 343
See application file for complete search history.

(56) References Cited

U.S. PATENT DOCUMENTS

| | | | | |
|---|---|---|---|---|
| 5,381,450 A | * | 1/1995 | Lane | 375/340 |
| 2006/0261952 A1 | | 11/2006 | Kavounas et al. | |
| 2007/0061682 A1 | | 3/2007 | Acikel et al. | |

OTHER PUBLICATIONS

International Search Report dated Jan. 22, 2010.

* cited by examiner

*Primary Examiner* — Arnold Kinkead
(74) *Attorney, Agent, or Firm* — Robert D. Shedd; Vincent E. Duffy; Michael A. Pugel

(57) ABSTRACT

The determination of the signal modulation format for a channel is an important aspect of the operation of a signal receiver. A method (700) is described including the steps of receiving (710) a signal, comparing (720) a sample of the received signal to a first threshold value and a second threshold value, creating (720) a signal profile based on the comparison, and selecting (750) a modulation format for the received signal based on the signal profile. An apparatus (500) is also described including a ring counter (510) that receives a sample of an input signal, compares the sample to a first threshold value and a second threshold value, and creates a signal profile for the input signal, a signal profiler (550) that compares the signal profile for the input signal to at least two reference profiles, and a detector (560) that determines a modulation format for the input signal based on the comparison in the signal profiler (550).

18 Claims, 7 Drawing Sheets

APPARATUS AND METHOD FOR DETERMINATION OF SIGNAL FORMAT

CROSS REFERENCE TO RELATED APPLICATIONS

This application claims the benefit, under 35 U.S.C. §365 of International Application PCT/US2009/046080, filed Jun. 3, 2009, which was published in accordance with PCT Article 21(2) on Dec. 23, 2009 in English and which claims the benefit of United States provisional patent application No. 61/130,911, filed Jun. 3, 2008.

FIELD OF THE INVENTION

The present disclosure relates generally to the operation of a signal receiving system and more specifically to the determination of the modulation format of channels or transponders received by a signal receiving device.

BACKGROUND OF THE INVENTION

This section is intended to introduce the reader to various aspects of art, which may be related to various aspects of the present invention that are described below. This discussion is believed to be helpful in providing the reader with background information to facilitate a better understanding of the various aspects of the present invention. Accordingly, it should be understood that these statements are to be read in this light, and not as admissions of prior art.

Today, most customer homes receive a number of programs containing video and audio content, as well as a large amount of data, from a plurality of sources, such as broadcast television, cable, satellite, digital subscriber line systems. These systems often utilize distribution networks to deliver the programs and content to the customer premises. Many distribution networks carry content on multiple channels or transponders that may originate from different sources (e.g. multiple satellites, cable head-ends, etc). The multiple channels or transponders from different sources are brought together on a single medium (e.g. coaxial cable) before going, for example, into a customer's home for connection to a television or settop box. As a result, a frequency map identifying the incoming channels or transponders, as well as certain characteristics, such as modulation formats, of each channel or transponder may not be completely known initially.

In instances where the frequency map is not completely known, and the modulation formats for the channels or transponders are not otherwise identified or specified, the television or settop box may be designed to perform some form of search in order to identify the modulation formats for channels or transponders so that the television or settop box can proceed to demodulate and decode the received signal. In one method, the television or settop box may implement a trial and error modulation format identification search. In a trial and error search, the receiving circuit in the television or settop box initializes the link circuit to demodulate the signal based on a first modulation format. If demodulation is unsuccessful, the search continues as each possible format may be iteratively attempted, to determine, for instance, the modulation depth or mapping of the constellation of symbols in the signal format.

Modern broadcast communications signal may use constellation maps that include formats having as few as 2 symbols or as many as 256 symbols and locations. For instance, there are several different constellations that can be transmitted under most QAM-based systems (e.g.—digital video broadcast-cable (DVB-C), or US cable standard J.83A). The trial and error modulation format identification search may become time consuming and inefficient if the first modulation format chosen is very different from the modulation format used by the received signal.

The problems with the trial and error search approach are further exacerbated by a system containing a large multi-source network with many possible signal types. The approach can take an unacceptably long period of time to determine the modulation format of each channel or transponder in such a large multi-source network. Further, if the network requires frequent re-initialization due to changes in the frequency mapping as well as changing to the modulation format of the channels or transponders, the resulting period of waiting may be unacceptable to the user. Therefore, there is a need for an improved apparatus and method for determining the modulation format of a signal.

SUMMARY OF THE INVENTION

In accordance with an aspect of the present embodiments, a method is described including the steps of receiving a signal, comparing a sample of the received signal to a first threshold value and a second threshold value, creating a signal profile based on the comparison, and selecting a modulation format for the received signal based on the signal profile.

In accordance with another aspect of the present embodiments, an apparatus is described including means for receiving a signal containing digital samples, means for comparing a sample value of the received signal to a first threshold value and a second threshold value, means for creating a signal profile based on the comparison, means for correlating the signal profile against at least two reference profiles, and means for selecting a modulation format for the received signal based on the correlation.

In accordance with yet another aspect of the present embodiments, an apparatus is described including, a ring counter that receives a sample of an input signal, compares the sample of the input signal to a first threshold value and a second threshold value, and creates a signal profile for the input signal, a signal profiler, coupled to the ring counter, that compares the signal profile for the input signal to at least two reference profiles, and a detector, coupled to the signal profiler, that determines a modulation format for the input signal based on the comparison in the signal profiler.

DETAILED DESCRIPTION

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort would nevertheless be a routine undertaking of design, fabrication, and manufacture for those of ordinary skill having the benefit of this disclosure.

The following describes a system relating to broadcast signals, and more particularly to broadcast signals as defined for use in a satellite or cable signal transmission system. The embodiments described may be used in a settop box, television, or similar signal receiving device. Examples of similar devices include, but are not limited to, cellular phones, intelligent phones, personal digital assistants, and laptop computers. Other systems utilized to receive other types of signals may include similar structures and processes. Those of ordinary skill in the art will appreciate that the embodiments of the circuits and processes described herein are merely one set of potential embodiments. It is important to note that signals compliant with various broadcast and wireless standards in general, may be transmitted in a manner other than over a satellite or cable network, including transmission over the air, through a wireless network, or over telephone lines. As such, in alternate embodiments, the components of the system may be rearranged or omitted, or additional components may be added. For example, with minor modifications, the system described may be configured for use in other terrestrial broadcast services, wi-fi video and audio services, or phone data services, including services used elsewhere in the world.

The embodiments described below are primarily related to reception of signals. Certain aspects of the embodiments including, but not limited to, certain control signals and power supply connections have not been described or shown in the figures but may easily be ascertained by a skilled artisan. It should be noted that the embodiments may be implemented using hardware, software, or any combination of both, including the use of a microprocessor and program code or custom integrated circuits. It should also be noted that many of the embodiments involve iterative operation and connection between the various elements of the embodiment. Alternative embodiments may be possible using pipelining architectures employing repeated identical elements, connected in series, in place of, or in addition to, the iteration operation embodiments described herein.

Figure 1:
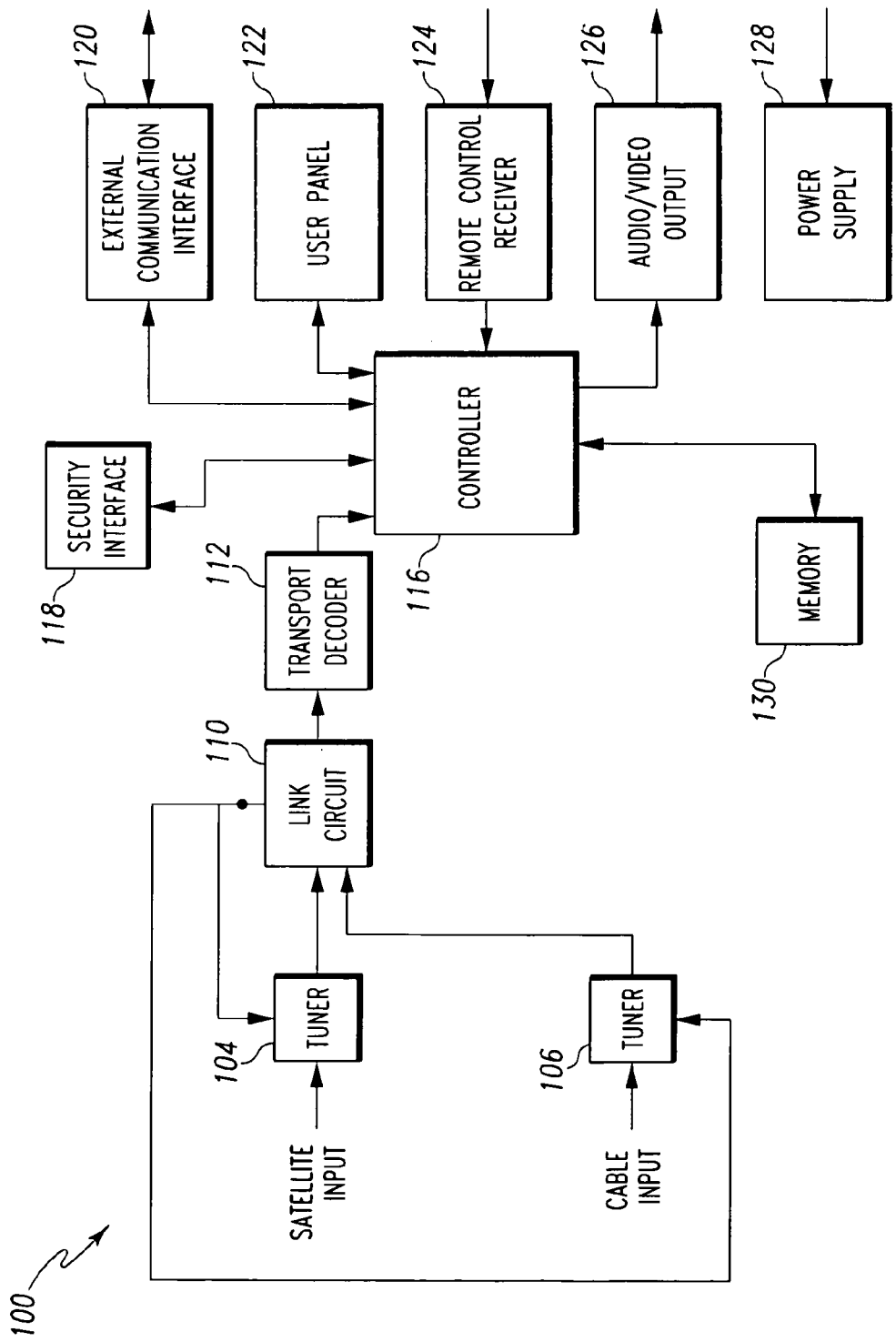
FIG. 1 is a block diagram of an embodiment of a receiver of the present disclosure.

Turning now to the drawings and referring initially to FIG. 1, an exemplary embodiment of a receiver 100 for receiving signals using aspects of the present disclosure is shown. Receiver 100 may be included as part of a settop box or television device and is capable of receiving either satellite signals or cable signals broadcast by a service provider to a customer premises location. A satellite signal stream, containing a plurality of transponders, is delivered from a satellite outdoor receiving unit, not shown, to a first tuner 104. A cable signal stream, also containing a plurality of channels, is delivered from a cable signal wired network to a second tuner 106. Tuner 104 and tuner 106 connect to link circuit 110. One output of link circuit 110 connects to transport decoder 112. A second output of link circuit 110 connects back to both tuner 104 and tuner 106. The output of transport decoder 112 connects to controller 116. Controller 116 also connects to security interface 118, external communication interface 120, user panel 122, remote control receiver 124, audio/video output 126, and memory 130. Power supply 128 may connect to all blocks, not shown, within receiver 100.

The satellite received signal stream is provided from an outdoor unit. The outdoor unit is configured to receive the signal stream from satellite transponders located on one or more satellites. In a preferred embodiment, two signals, each contain a plurality of transponders are received by the outdoor unit, and converted to a frequency range of 950 to 2150 megahertz (MHz), referred to as L-band. The signal stream in the L-band frequency range is delivered to tuner 104.

Tuner 104 processes the satellite signal stream by selecting or tuning one or more of the transponders in the satellite signal stream to produce one or more baseband signals. Tuner 104 contains circuits such as amplifiers, filters, mixers, and oscillators, for amplifying, filtering and frequency converting the split signal stream. Tuner 104 typically is controlled, or tuned, by either link circuit 110 or by another controller, such as controller 116, which will be described later. The control commands include commands for changing the frequency of an oscillator used with a mixer in tuner 104 to perform the frequency conversion.

The cable received signal stream is provided from a cable plant network. The cable plant network is typically a network supporting wired transmission of content across a geographic area. The network provides an interface for the cable signal stream to a premises location, usually through coaxial cable. In a preferred embodiment, the cable received signal stream contains a plurality of channels located in the frequency range between 50 MHz and 800 MHz. The cable signal stream in this cable frequency range is delivered to tuner 106.

Tuner 106 processes the cable signal stream by selecting or tuning one or more of the channels in the cable signal stream to produce one or more baseband signals. Tuner 106 contains circuits such as amplifiers, filters, mixers, and oscillators, for amplifying, filtering and frequency converting the cable signal stream. Tuner 106 typically is controlled, or tuned, by either link circuit 110 or by another controller, such as controller 116, which will be described later. The control commands include commands for changing the frequency of an oscillator used with a mixer in tuner 106 to perform the frequency conversion.

Typically the baseband signals at the output of tuner 104 or tuner 106 may collectively be referred to as the desired received signal and represent one or more transponders or channels selected, or tuned, out of the group of transponders or channels that were received as the input signal stream. Although the signal is described as a baseband signal, this signal may actually be positioned at a frequency that is only near to baseband.

The one or more baseband signals from tuner 104 and tuner 106 are provided to link circuit 110. Link circuit 110 typically contains the processing circuits, such as analog to digital (A/D) converters, needed to convert the one or more baseband signals into a digital signal for demodulation by the remaining circuitry of link circuit 110. In one embodiment the digital signal may represent a digital version of the one or more baseband signals. In another embodiment the digital signal may represent the vector form of the one or more baseband signals. Link circuit may also select which of the baseband signals from tuner 104 and tuner 106 is processed. In one embodiment, a user control selects either a cable mode or a satellite mode. The control information is provided to the link circuit 110 from controller 116. The link circuit then selects either the signal from tuner 104 for satellite mode or the signal from tuner 106 cable mode for further processing.

Link circuit 110 also demodulates and performs error correction on the digital signal to produce a transport signal. The transport signal may represent a data stream for one program, often referred to as a single program transport streams (SPTS), or it may represent multiple program streams multiplexed together, referred to as a multiple program transport stream (MPTS). Operation of portions of link circuit 110 will be described in further detail below. Link circuit 110 may also include circuitry for determining the modulation formats of the channels or transponders in the digital signal. The circuitry for determining the modulation formats may include circuitry for detecting and comparing signal characteristics, such as signal levels. The circuitry may also include circuitry for determining a particular data symbol constellation map after identifying a signal modulation format based on a comparison of histogram profiles generated by the signal characteristic comparison. Operation of the circuitry for determining modulation formats will be described in further detail below.

The transport signal from link circuit 110 is provided to transport decoder 112. Transport decoder 112 typically separates the transport signal, which is provided as either a SPTS or MPTS, into individual program streams and control signals. Transport decoder 112 also decodes the program streams, and creates audio and video signals from these decoded program streams. In one embodiment, transport decoder 112 is directed by user inputs or through a controller, such as controller 116, to decode only the one program stream that has been selected by a user and create only one audio and video signal corresponding to this one decoded program stream. In another embodiment, transport decoder 112 may be directed to decode all of the available program streams and then create one more audio and video signals depending on user request.

The audio and video signals, along with any necessary control signals, from transport decoder 112 are provided to controller 116. Controller 116 manages the routing and interfacing of the audio, video, and control signals and, further, controls various functions within set top box 100. For example, the audio and video signals from transport decoder 112 may be routed through controller 116 to an audio/video (A/V) output 126. A/V output 126 supplies the audio and video signals from set top box 100 for use by external devices such as televisions or computers. Also, the audio and video signals from transport decoder 112 may be routed through controller 116 to memory block 130 for recording and storage. Memory block 130 may contain several forms of memory including random access memory (RAM), flash, hard media such as a hard disk drive. Memory block 130 may include a memory section for storage of instructions and data used by controller 116 as well as a memory section for audio and video signal storage. Controller 116 may also allow storage of signals in memory block 130 in an alternate form such as an MPTS or SPTS from transport decoder 112.

Controller 116 also sends signals to, and receives signals from, an external communication interface 120. External communication interface 120 may include a phone modem for providing phone connection to a service provider. External communication interface 120 permits, among other things, the authorization by a service provider for the use of the audio and video signals in receiver 100. Controller 116 also sends signals to, and receives signals from, a security interface 118. Security interface 118 may include a smart card, for communicating signals for managing the use of the audio/video signals and preventing unauthorized use. User control is accomplished through user panel 122 and remote control receiver 124. User panel 122 provides a direct input of user commands to control the operation of receiver 100 while remote control receiver 124 is used for receiving user commands from an external remote control device. Both user panel 122 and remote control receiver 124 provide user control signals to controller 116. Although not shown, controller 116 may also interface signals to the tuner 104, tuner 106, link circuit 110, and transport decoder 112 to provide initial set-up information as well as for passing control information between the blocks. Finally, power supply 128 typically connects to all of the blocks in receiver 100 and supplies the power to those blocks as well as providing power to any of the elements needing power externally, such as the satellite outdoor unit.

It should be appreciated by one skilled in the art that the blocks described inside receiver 100 have important interrelations, and some blocks may be combined and/or rearranged and still provide the same basic overall functionality. For example, link circuit 110 and transport decoder 112 may be combined and further integrate some or all of the functions of controller 116 to act as the main decoder/controller for set top box 100. Further, control of various functions may be distributed or allocated based on specific design applications and requirements, such as use in a settop box or television device.

Figure 2:
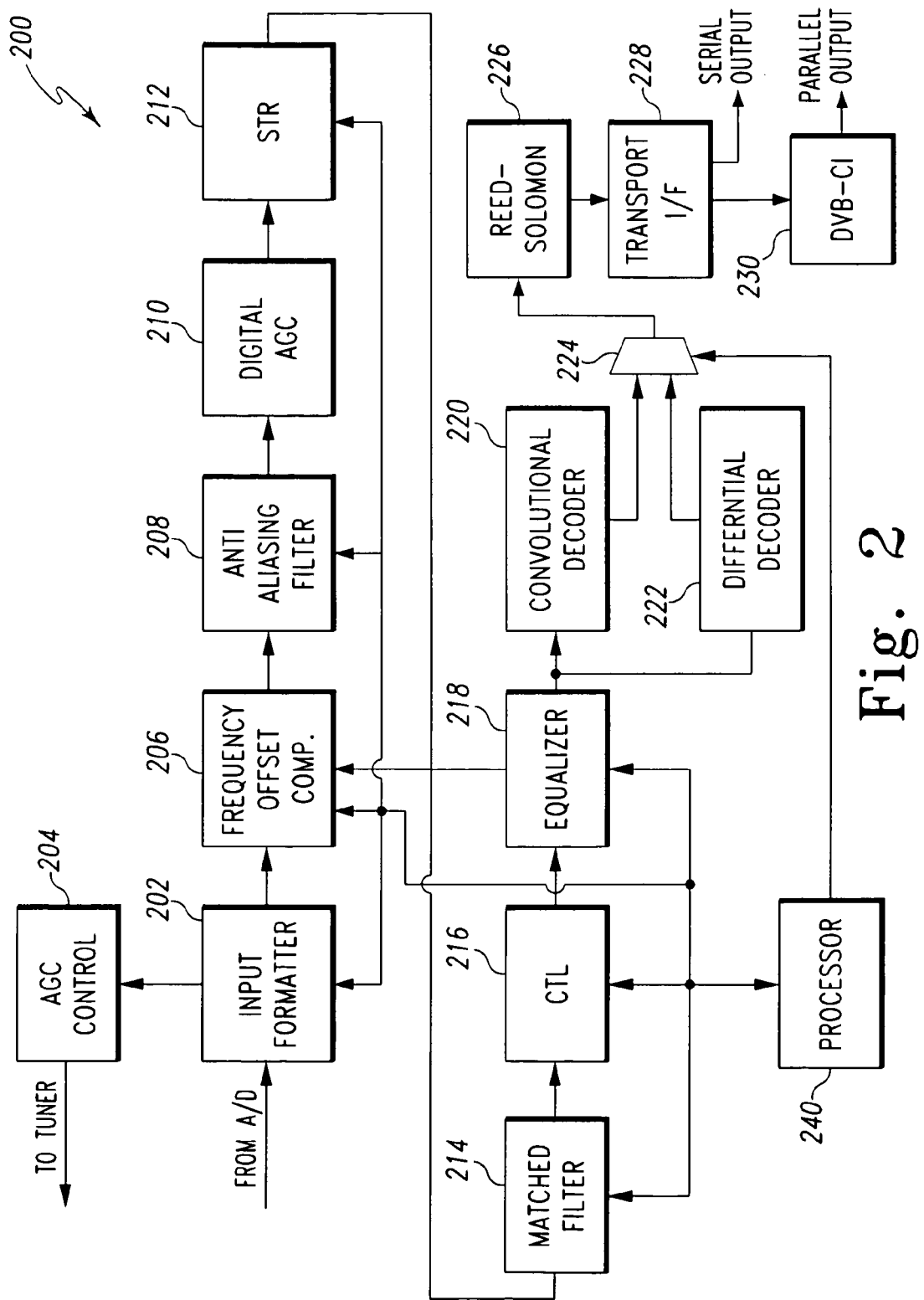
FIG. 2 is a block diagram of an embodiment of a link circuit used in a receiver of the present disclosure.

Turning now to FIG. 2, a block diagram of an embodiment of a link circuit 200 using aspects of the present disclosure is shown. Link circuit 200 may be used in a signal receiver, such as receiver 100 described in FIG. 1. Link circuit 200 is capable of receiving and demodulation signals in several signal formats provided by satellite, cable, or terrestrial transmission systems including, but not limited to quaternary phase shift keying (QPSK) modulation, 16 level quadrature amplitude (16 QAM) modulation, 32 QAM modulation, 64 QAM modulation, 128 QAM modulation, and 256 QAM modulation. In a preferred embodiment, link circuit 200 is capable of receiving and demodulating signals according to the DVB-S and DVB-C standards.

In link circuit 200, an input signal is received from an A/D converter, not shown, and provided to the input formatter 202. The input formatter 202 is connected to an automatic gain control (AGC) 204, which provides a signal back to a tuner, such as tuner 104 or tuner 106 in FIG. 1. Input formatter 202 is also connected to frequency offset compensation circuit 206. The frequency offset compensation circuit 206 is connected to an anti-aliasing filter 208. The anti-aliasing filter 208 is connected to digital AGC 210. The digital AGC 210 is connected to the sampling timing recovery (STR) block 212. The STR block 212 is connected to the matched filter 214. The matched filter 214 is connected to the carrier tracking loop (CTL) 216. The CTL is connected to the equalizer 218. The equalizer 218 is connected to both the convolutional decoder 220 and the differential decoder 222. The equalizer 218 is also connected as feedback back to the frequency offset compensation circuit 206. The convolutional decoder 220 and differential decoder 222 are connected to mux 224. The output of mux 224 is connected to Reed-Solomon decoder 226. The output of Reed-Solomon decoder 226 is connected to the transport interface 228. Transport interface provides an output as a serial transport output stream used by a transport decoder, such as transport decoder 112 in FIG. 1. The transport interface is also connected to a DVB-Common Interface (DVB-CI) block 230. DVB-CI block outputs a parallel data transport stream specifically for use by transport decoders complying with the DVB-CI standard.

It is important to note that the format of the data signals passed between the blocks in link circuit 200 typically represents a complex phasor signal be in a vector signal format. Vector signal format signals permit interconnections using a single data line connection. Alternatively, the format of the signals may be in a scalar format, such as I/O signal format. I/O signal format signals require two data lines and connections, one each for the I and Q signal. Choice of signal format used may depend on the type of A/D converter used or may be a matter of design choice The incoming signal is provided to the input formatter 202. Input formatter 202 removes any DC offset introduced by the A/D converter. In addition, the input formatter 202 may perform a spectral inversion and/or a binary offset to two's complement conversion if necessary based on the signal format. Further, input formatter 202 may also remove any I/Q imbalance, if the signal is provided in I/Q format, by adaption of I/Q gain imbalance and I/Q phase imbalance.

One signal from the input formatter 202 is provided to AGC 204. AGC 204 provides control signal to a tuner, such as tuner 104 or tuner 106 in FIG. 1, for adjusting the signal gain or amplification in the tuner. The control signal may be based on a determination of signal power or some other form of measurement of signal quality.

The other formatted signal from the input formatter 202 is provided to the frequency offset compensation circuit 206. The frequency offset compensation circuit 206 operates to subtract or remove coarse frequency error present in the signal by controlling a frequency offset register or using a leakage signal that may be generated in CTL 216, processed in equalizer 218, and provided as a feedback signal back to the frequency offset compensation circuit 206.

The offset compensated signal is provided to anti aliasing filter 208. Anti aliasing filter 208 is used to suppress undesired signal products introduced by the tuning and demodulation process, such as signal frequency conversion aliasing. Anti aliasing filter 208 may be implemented using a number of known digital filter techniques. In a preferred embodiment, anti aliasing filter 208 is a fully programmable 49 tap symmetric finite impulse response (FIR) filter.

The filtered signal is provided to digital AGC 210. The digital AGC 210 measures the incoming signal level or the incoming signal quality, computes a gain error signal, and adjusts the signal level of the signal. Digital AGC 210 adjusts the signal in order to provide a maximum level or maximum signal quality signal using all of the available dynamic range prior to the critical signal demodulation steps that follow.

The digital AGCed signal is provided to STR block 212. STR block 212 adaptively resamples the signal over a range of resampling rates in order to produce 2 samples/symbol and to correct for sample timing errors relative to the position of the samples within the symbol. STR block 210 also provides a symbol enable signal for indication of the optimum sampling point and a sample enable signal for providing the second sample on the symbol. STR block 210 may perform phase error estimation as part of the resampling and re-timing using a number of estimation algorithms, such as the Gardner 2× algorithm.

The re-sampled signal is provided to matched filter 214. The matched filter 214 provides the necessary spectral shaping of the signal in order to minimize inter-symbol interference. The matched filter 214 filter response is specified based on the specifications for the transmitted signal format. The specification will typically identify the filter characteristic, such as a root-raised cosine spectral shaping, and also specify a rolloff factor as a percentage the signal bandwidth or the symbol rate. Matched filter 214 is typically implemented as a multi-tap FIR filter having one or more programmable filter taps in order to account for the possible filter responses.

The matched filtered signal is provided CTL block 216. The CTL adaptively removes the fine frequency and phase offset introduced by inaccurate mixing or frequency drift in a tuner or low noise block converter (LNB). Additionally, CTL block 216 may generate an error signal indicating a coarse frequency error. The coarse frequency error may be provided for use by another frequency adjustment block, such as the frequency offset compensation block 206 after processing in the equalizer 218. The coarse frequency error may also be provided to the microprocessor 240 to indicate that the tuner, such as tuner 104 or tuner 106 in FIG. 1, may be re-tuned to reduce the frequency error.

The frequency corrected signal is provided to equalizer 218. In general, equalizer 218 is configured to reduce the multi-path distortion effects of the transmission channel through which the received signal has been transmitted. Equalizer 218 may adjust or change the amplitude or phase information associated with received signal. Equalizer 218 adjusts the amplitude or phase information based on information from computations and operations performed on the demodulated OFDM signal within equalizer 640. Equalizer 218 may use a finite impulse response (FIR) or feed forward equalization (FFE) algorithm as well as a decision feedback equalization (DFE) algorithm, both employing adaptable filter structures that may be real valued or complex valued. The calculation of the adjustable tap values in the filter may employ a least mean square (LMS) algorithm, where the LMS error could be calculated in decision-directed or blind mode. The equalizer may also partially or fully demodulate the modulated symbols in the received signal into a string of bits based on a defined or determined symbol constellation map associated with the signal modulation format.

The equalized and demodulated signal is provided to convolutional decoder 220 and also to differential decoder 222. Each of these decoder circuits is included for demodulating and decoding specific signal formats included in cable or satellite signal transmission specifications. In a preferred embodiment, convolutional decoder 220 is adapted for decoding the bit stream based on the DVB-S signal format while the differential decoder is adapted for decoding a bit stream based on the DVB-C signal format.

Each of the decoded signals from convolutional decoder 220 and differential decoder 222 is provided to mux 224. Mux 224 selects one of the two signals produces that signal as an output. The selection may be done based on predetermined information, such as user input selecting a particular operating mode, either cable or satellite. The selection may also be performed automatically, based on the determination and identification of the signal type using the signal detection technique described below. Additionally, the decoder producing the non-selected signal, either convolutional decoder 220 or differential decoder 222, may be disabled in order to conserve power.

The selected decoded output is provided to the Reed-Solomon decoder 226. Reed-Solomon decoder groups portions of the signal into packets of bytes of data. In a preferred embodiment, Reed-Solomon encoder groups the data in the signal into packets containing 204 bytes of data. Reed-Solomon decoder 226 decodes each packet of 204 bytes of data to produce 188 error corrected bytes. The Reed-Solomon process defined here is capable of correcting errors in up to 8 bytes in each packet.

The Reed-Solomon decoded data packets are provided to the transport interface 228. Transport interface 228 formats the data packets in order to produce a serial transport data stream that is output for use in a transport decoder. The transport interface stream is also provided to the DVB-CI interface 230. The DVB-CI interface re-formats the serial transport stream into a parallel transport stream and makes any additional changes to the stream to comply with the requirements of the DVB-CI specification. DVB-CI interface 230 outputs a DVB-CI compliant parallel transport stream signal.

A processor 240 provides control signals and a separate communications interface to the various blocks within link circuit 200. Processor 240 may be embodied as a separate hardware device, such as a microprocessor, or may alternatively be embodied as part of a larger central processing unit within a receiving device. Processor 240, may for instance, receive inputs from either the frequency offset compensation circuit 206 or equalizer 218 and provide control signal outputs to a tuner, such as tuner 104 or tuner 106 in FIG. 1 based on those received inputs. Processor 240 may also include a memory for storing information such as channel information and operational data such as initial settings for the blocks in link circuit 200.

Depending upon the mode of operation, several of the blocks within the link circuit 200 may be active or inactive and may be operationally bypassed. For instance, link circuit may be operated in a mode that allows for the determination of modulation format. In modulation format mode, several of the blocks may be inactive and only the blocks necessary for modulation format identification, such as input formatter 202, AGC control 204, frequency offset compensation circuit 206, and equalizer 218, may be operational. The reduced number of active blocks may improve the operational efficiency and speed of the determination process. The modulation format determination and identification process will be described in further detail below.

Figure 3:
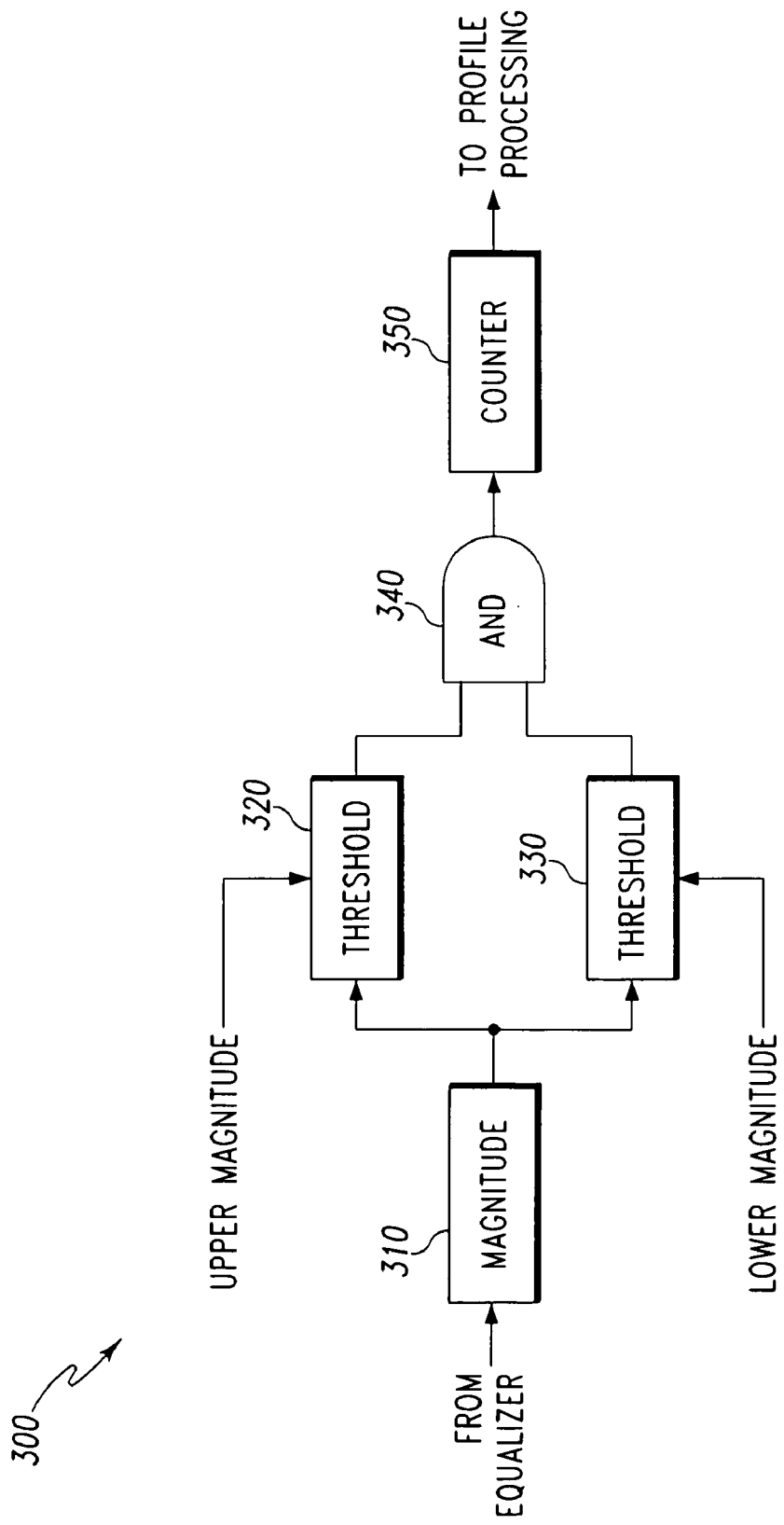
FIG. 3 is a block diagram of an embodiment of a ring counter circuit used in a receiver of the present disclosure.

Turning to FIG. 3 a block diagram of an embodiment of a ring counter 300 used in a receiver using aspects of the present disclosure is shown. Ring counter 300 may be used for determining and comparing characteristics, such as signal level or signal magnitude of the complex phasor input signal, related to a received channel or transponder as a part of the determination of the modulation format for the incoming received signal. The comparison results may be used to generate a signal profile histogram that may be further compared to reference profile histograms to determine the modulation format. Ring counter 300 may be included as part of an equalizer circuit, such as equalizer 218 shown in FIG. 2. It is also important to note that ring counter 300 may determine the characteristics of a complex signal for a channel included in a signal provide by several signal sources, such as a transponder in a satellite signal or a channel in a cable signal.

A complex phasor input signal, in either a vector or scalar signal format, present at the input to ring counter 300 is provided to magnitude detector 310. Magnitude detector 310 is connected to both upper threshold detector 320 and lower threshold detector 330. Upper threshold detector 320 also receives an upper magnitude value as an input. Lower threshold detector 330 also receives a lower magnitude value as an input. Both upper threshold detector 320 and lower threshold detector 330 are connected to combining circuit 340. Combining circuit 340 is connected to counter 350. The output of counter 350 represents the output of ring counter 300 and is provided to other circuitry for further profile processing.

The input signal is provided to magnitude detector 310. The input signal may be a digitally sampled signal representing a channel or transponder that is either fully or partially equalized but has not been demodulated. Magnitude detector 310 removes the complex phase information for each sample of the input digital signal and produces a scalar signal representing the absolute value or magnitude of the digital signal. In other words, magnitude detector converts the input signal that may be located along a ring that is a radial distance from the origin on a vector scale graph to a value equal to only the radial value from the origin. In a preferred embodiment, magnitude detector 310 computes the magnitude of the incoming signal by multiplying each sample of the input signal with a complex conjugate of the sample.

The magnitude valued signal is provided to both upper threshold detector 320 and lower threshold detector 330. Upper threshold detector 320 and lower threshold detector 330 together establish a windowed comparison circuit. Based on the values of upper magnitude and lower magnitude provided to upper threshold detector 320 and lower threshold detector 330, the upper threshold detector 320 will output a binary value of 1 if the magnitude value of the input signal is less than the upper magnitude in upper threshold detector 320. The output will be a binary value of 0 if the magnitude value is greater. Similarly, the lower threshold detector 330 will output a binary value of 1 if the magnitude value of the input signal is greater than the lower magnitude provided to lower threshold detector 330. The output will be a binary value of 0 if the magnitude value is greater. Each of the outputs of upper threshold detector 320 and lower threshold detector 330 are provided to combining circuit 340. Combining circuit 340 implements a Boolean logic 'AND' function in order to complete the windowed comparison. As a result, the output of combining circuit 340 will be a binary value 1 if magnitude value of the input signal is less than the upper magnitude reference value in upper threshold detector 320 and greater than the lower magnitude reference value in lower threshold detector 330.

The binary values from combining circuit 340 are provided to counter 350. Counter 350 maintains a count of the number of binary 1 values resulting for each of the samples of the input signal. Counter 350 may contain a memory for storing the count value. The memory may be implemented as one or more registers for storing several count values. Alternately, the memory may be a more complex structure, such as random access memory, for storing and maintaining a larger number of count values.

Ring counter 300 may include the capability of programmable operation. For instance, the upper magnitude reference value and lower magnitude reference value may change multiple times even for each sample in the input signal. Each of these magnitude reference value sets may also be associated with a separate counter register or memory location in counter 350. The magnitude value is window compared to each set of programmable magnitude reference values. If the magnitude value is within the window, the window representing a ring annulus of signal energy in the input signal, then combining circuit 340 outputs a binary 1 value and the counter register or memory location in counter 350 associated with the particular set of programmable magnitude reference values is incremented.

The set of programmable magnitude reference values for the upper magnitude reference value and lower magnitude reference value may span the possible magnitude values for the incoming signal. For instance, a set of magnitude reference values may be selected so as to span the expected range for the magnitude value of the input digital signal. The magnitude reference values may also be chosen to break up, or segment, the expected range for the magnitude value of the input digital signal into a set of continuous comparison window segments. In this way, the magnitude value of the input signal can be window compared against successive segments using the sets of magnitude reference values and a count value incremented for the appropriate window comparison. The magnitude reference values may be provided by an equalizer, such as equalizer, such as equalizer 218 in FIG. 2. The magnitude reference values may alternately be provided by a processor, such as processor 240. As a result, a single ring counter 300 may be used to provide count values for covering the entire magnitude value range of the input signal over a continuous series of comparison window segments. The count value bins may then be used to form a histogram profile of the incoming signal.

Alternately, all, or a portion, of ring counter 300 may be duplicated multiple times, in order to implement a full range windowed comparison ring counter, and used to create a histogram or signal profile for the input signal. For example, the magnitude value of the input signal may be provided to a set of windowed comparison circuits each including a separate upper magnitude threshold detector 320, lower magnitude threshold detector 330, and combining circuit 340, with each using a different set of upper and lower magnitude reference values. Each of the outputs of the combining circuits may be provided to a counter circuit 350 containing individual registers or memory locations for each of the outputs. A multiple parallel ring counter structure of ring counter 300 may be used to account for different constellations. Additionally, the magnitude reference values in a multiple parallel ring counter structure may be programmable.

Ring Counter 300 may also process a programmable number of samples of the digitally sampled input signal to generate the resulting set of count values. For example, the number of samples used by ring counter 300 to generate count values may be programmable from a value of 64 to a value of 65,536. A larger number of samples used by ring counter 300 may improve the accuracy of the histogram profile that is created, but also may delay the time to complete the modulation format determination.

Figure 4:
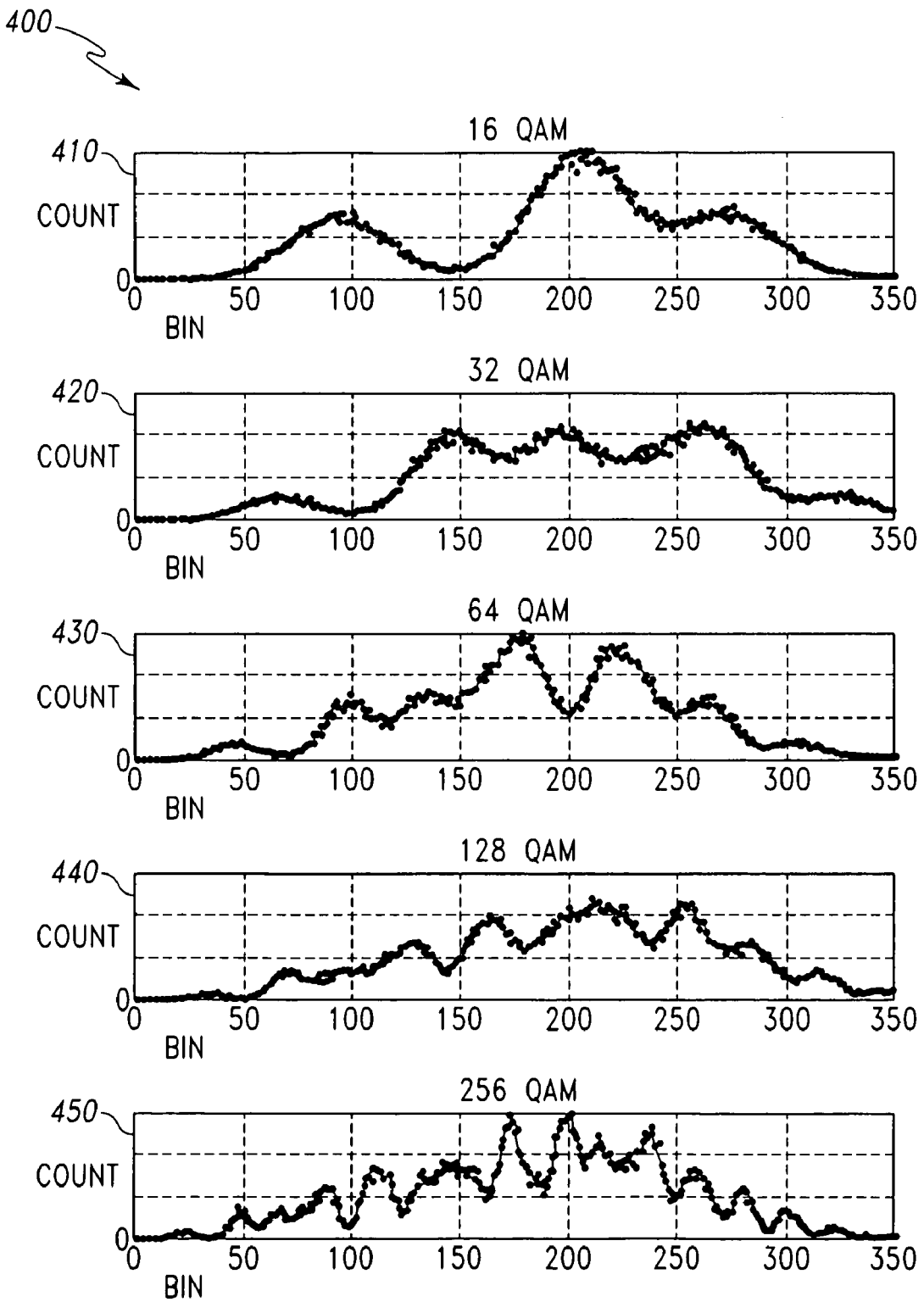
FIG. 4 is a graph illustrating a set of signal format profiles of the present disclosure.

Turning now to FIG. 4, a graph illustrating a set of signal format profiles 400 using aspects of the present disclosure is shown. Profile set 400 shows the profile histograms produced at the output of ring counter 300 for a set of 65,536 samples of signals of five different modulation formats. Histogram 410 represents a signal using 16 QAM modulation operating with a signal to noise ratio (SNR) of 16 decibels (dB). Histogram 420 represents a signal using 32 QAM modulation operating at an SNR of 19 dB. Histogram 430 represents a signal using 64 QAM modulation operating at an SNR of 22 dB. Histogram 440 represents a signal using 128 QAM modulation operating at an SNR of 25 dB. Finally, histogram 450 represents a signal using 256 QAM modulation operating at an SNR of 30 dB. The histogram may be generated for each constellation order at an SNR that is well below a typical useable signal operating threshold. Even at a very low SNR, distinctive differences may be identified between the histograms 410-450. The total number of points used for each histogram 410-450 is 65,536 points. However other numbers of points may be used as practically necessary for performance or characterization. A bin number for each histogram 410-450 is the bin number is displayed along the x axis, representing a different count value register in counter 350. A count value for each histogram 410-450 is displayed along the y axis.

In profile set 400, a total of 350 bins are used in each histogram 410-450 to span the full range of the magnitude values of the input signal. The number of bins used may be constrained by the amount of processing time available, as well as the size or speed of the circuitry used, in ring counter 300. A smaller number of bins, such as 32 bins, may be used and results in very little degradation in accuracy.

It is important to note that in order to assure any signal profiles that may be generated for further comparison to an input signal histogram profile, as a part of determining the modulation format, should be generated using the same operating parameters for the link circuit. In a preferred embodiment, the profiles are generated using operating parameters in an equalizer, such as equalizer 218, set to blind-mode with constellation symbol ring estimate value equal to the symbol ring value for 16 QAM.

Figure 5:
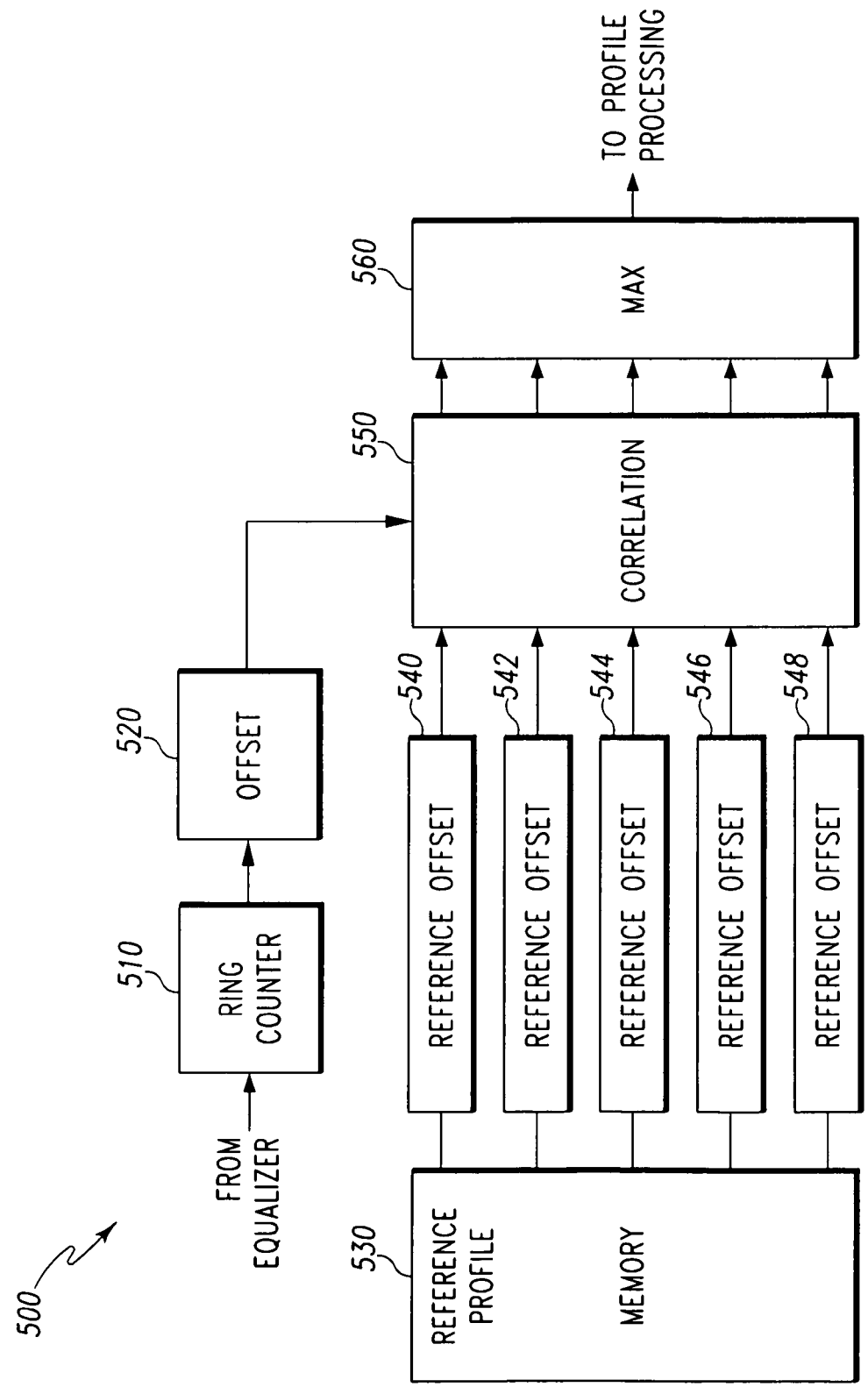
FIG. 5 is a block diagram of an embodiment of a signal format profiler used in a receiver of the present disclosure.

Turning now to FIG. 5, a block diagram of an embodiment of a signal format profiler 500 using aspects of the present disclosure is shown. Signal format profiler 500 may be used for determining the modulation format for a transponder or channel in a received signal. Signal format profiler 500 uses representative, or reference, signal profiles for a set of modulation formats at a particular SNR, such as the histogram profiles shown in FIG. 4. Signal format profiler 500 compares the profile histogram produced for the input signal to a number of stored reference ring counter profiles, in order to determine the modulation format. Signal format profiler 500 may be included as part of an equalizer circuit, such as equalizer 218 in FIG. 2, and included as circuitry operated prior to the demodulation circuitry. The resulting output from signal format profiler 500 may be used in further adjusting the equalizer as well as for demodulating the signal format determined. The resulting output from signal format profiler 500 may also be provided to a processor, such as processor 240 in FIG. 2 for use by other circuits in the link circuit or may be provided to the other circuits in the link circuit directly. A portion of signal format profiler 500 may also be included in a processor, such as processor 240, with the resulting output provided to other circuits in the link circuit, such as equalizer 218.

An input signal from an equalizer, not shown, is provided to ring counter 510. The output of ring counter 510 is connected to input offset block 520. A reference profile memory 530 provides outputs to reference offset blocks 540-548. The outputs of reference offset blocks 540-548, along with the output of input offset block 520, are connected to correlation block 550. The outputs of correlation block 550 are connected to max detection block 560. The output of max detection block represents the output of signal format profiler 500 and may be provided to other circuits, such as equalizer 218 or processor 240 shown in FIG. 2.

The input signal from the equalizer is provided to ring counter 510. Ring counter 510 operates in a substantially similar manner as ring counter 300 described in FIG. 3 and will not be further described here. It is important to note that ring counter 510 may be implemented as a single ring counter using programmable magnitude reference levels. Ring counter 510 may also be implemented as a multiple parallel ring counter structure using a set of parallel windowed comparison circuits. In a preferred embodiment, ring counter 510 produces an input signal profile histogram based on a set of 32 count values spanning the magnitude range of the input signal.

The count values from ring counter 510 are provided to input offset block 520. Input offset block 520 determines a new offset signal profile for the input signal based on a weighted average of values computed from a set of reference profiles stored in reference profile memory 530. Input offset block 520 outputs a new set of offset count values, representing an input offset profile histogram, by subtracting the computed weighted average from the input count values. Input offset block 520 may also include a memory to store the offset count values. The weighted average computed for the count values may also be stored and used in reference offset blocks 540-548.

A reference profile memory 530 stores a set of reference profiles corresponding to a set of modulation formats for the types of signals received. The set of reference profiles may include profiles at different signal conditions, such as different signal to noise ratios (SNRs). The reference profiles should match the operating conditions for the input signal, such as the number of samples used and the numbers of bins, or count values, used for the profile histogram. The reference profiles may be determined and stored prior to manufacture of the receiving device that includes signal format profiler 500 and stored in reference profile memory 530 during manufacture. The reference profiles may also be determined by a processor, such as processor 240 in FIG. 2, or determined based on earlier operation of signal format profiler 500. In a preferred embodiment, reference profile memory 530 stores and provides a reference profile for a 16 QAM signal, a 32 QAM signal, a 64 QAM signal, a 128 QAM signal, and a 256 QAM signal, all determined or computed at the same SNR, such as 25 dB. Reference profile memory 530 may store reference profiles for each type of constellation with respect to modulation format at multiple SNRs.

Each of the reference profiles, represented as values in a histogram similar in format to the input histogram profile, is provided to reference offset blocks 540-548. Each of the reference offset blocks determines a new offset signal profile or histogram for the reference profiles based on a weighted average of values computed from the set of reference profiles stored in reference profile memory 530 in a manner similar the input offset block 520. An offset reference profile is computed in each of reference offset blocks 540-548 by subtracting the computed weighted average from the provided reference profile count values. In addition, one or more of the reference offset blocks 540-548 may include circuitry for computing the weighted average values for the set of reference profiles. The weighted average values may also be computed by other circuitry, such as processor 240 described in FIG. 2. Each of the reference offset blocks 540-548 may also include a memory to store the reference offset count values.

As described above, the input offset block 520 and the reference offset blocks 540-548 use a weighted average of the reference profile values computed in one or more of the reference offset blocks 540-548 in order to determine the offset profile values. The weighted average used for computation may depend on several factors, such as the number of, and types of, modulation formats being used for comparison to determine the modulation format of the input signal. For example, the weighted average could be equally weighted. In a preferred embodiment, an equally weighted average may be computed using the following equation:

$$Avg_{equal}=(0.2)\cdot 16QAM+(0.2)\cdot 32QAM+ (0.2)\cdot 64QAM+(0.2)\cdot 128QAM+(0.2)\cdot 256QAM \quad (1)$$

In equation (1), the values 16QAM, 32QAM, 64QAM, 128QAM, and 256QAM are the count values for a particular bin in each of the corresponding reference profiles. It is important to note that the coefficients, or weights, should add to a value of one.

The equal weighting equation (1) may work well for many signal operating conditions related to the received input signal. However, depending on the modulation formats used for comparison, some of the reference profiles may closely resemble other reference profiles after weighted averaging using equal weighting, making it more difficult to distinguish between them. Also, the input profile, after offset is performed, may similarly resemble more than one of the reference profiles, further complicating any future comparison distinction. The input signal may also be corrupted by various levels of noise, multipath and AGC errors, thus distorting the input profile and further reducing the distinction between the input profiles and one or more of the reference profiles. For instance, signal distortion and noise may soften or blur the distinctive peaks present in the input signal profile, as can be in the histograms 410-450 for each different type of constellation and modulation format shown in FIG. 4. As a result, it may be difficult to reliably distinguish between certain profiles using an equally weighted average. By applying non-equal weighting, it may be possible to greatly improve discrimination between similar profiles, possibly at the expense of discrimination between dissimilar profiles. A non-equal weighting average may be computed using the following equation:

$$Avg_{unequal}=(0.04)\cdot 16QAM+(0.04)\cdot 32QAM+ (0.08)\cdot 64QAM+(0.42)\cdot 128QAM+ (0.42)\cdot 256QAM \quad (2)$$

In equation (2), the values 16QAM, 32QAM, 64QAM, 128QAM, and 256QAM are the count values the same as used in equation (1). Also as in equation (1), the coefficients, or weights, should add to a value of one.

Offset reference blocks 540-548 may also include a gain adjustment circuit. The gain factor for each of the reference profiles may be unique, and is often calculated so that the calculated correlation values will have a nominal value of unity when there is a perfect constellation match. The gain adjustment may be required in order to be able to directly compare final values in max detection block 560 to find the best match. The gain adjustment may be computed using the following formula for a gain value K for each reference profile:

$$K_N = \frac{1}{\sum_{i=0}^{31}\left(ref_{N_i}-ave_i\right)^2} \quad (3)$$

In equation (3), the $ref_N$ value is the corresponding reference profile, the ave value is the weighted average computed in equation (1) or (2), and the i value is the bin number. The total number of bins used is 32.

The gain adjustment values calculated for each reference profile are multiplied with the offset reference values for each reference profile to generate the final output offset reference values. The reference profiles, weighted average, and offset & gain adjusted profiles are all calculated prior to processing in correlation detector 550 so that the correlation detector 550 is not burdened with these determinations. The final offset values may be stored in a memory located in each of the reference offset blocks 540-548. In a preferred embodiment, the weighted average computed for the set of profiles would be stored as 32 values, and the five offset and gain adjusted reference profiles would be stored as five sets of 32 values.

It is important to note that the reference offset values may be computed at a time prior to use and stored in a memory in reference offset blocks 540-548 or in a different memory, such as reference profile memory 530. Additionally, the computation may be carried out by a separate circuit, such as processor 240 in FIG. 2, and stored in reference profile memory. In this case, reference offset blocks 540-548 may not be used and may be disabled or removed from signal format profiler 500.

The reference offset count values from each of the reference offset profiles, along with the input offset count values from the input offset profile, are provided to correlation block 550. Correlation block 550 compares each of the reference offset profiles to the input offset profiles and computes a correlation value. The correlation value for each comparison may be calculated using the following:

$$corr_N = \sum_{i=0}^{31} ogref_{N_i}(in_i - ave_i) \quad (4)$$

In equation (4) the value corr is the calculated correlation between the offset input profile and each of the offset reference profiles, the value ogref is the offset reference value of each bin for each reference profile, and the value in parentheses is the input reference value minus the average value for each bin in the input profile.

The calculated correlation values from correlation block 550 are provided to the max detection block 560. The max detection block 560 compare each of the calculated correlation values and selects the largest, or most positive, value. The largest value indicates the best match for the modulation type, and the best constellation type, determined by signal format profiler 500. Additionally, max detection block 560 may compare the largest value and the second largest value and compute a confidence value. The confidence value may be provided to the equalizer along with provide good confidence measures for the detector. For instance, if the confidence factor is determined to be low, then a receiver circuit may attempt to retry channel or transponder acquisition using several different acquisition parameters in the link circuit.

Figure 6:
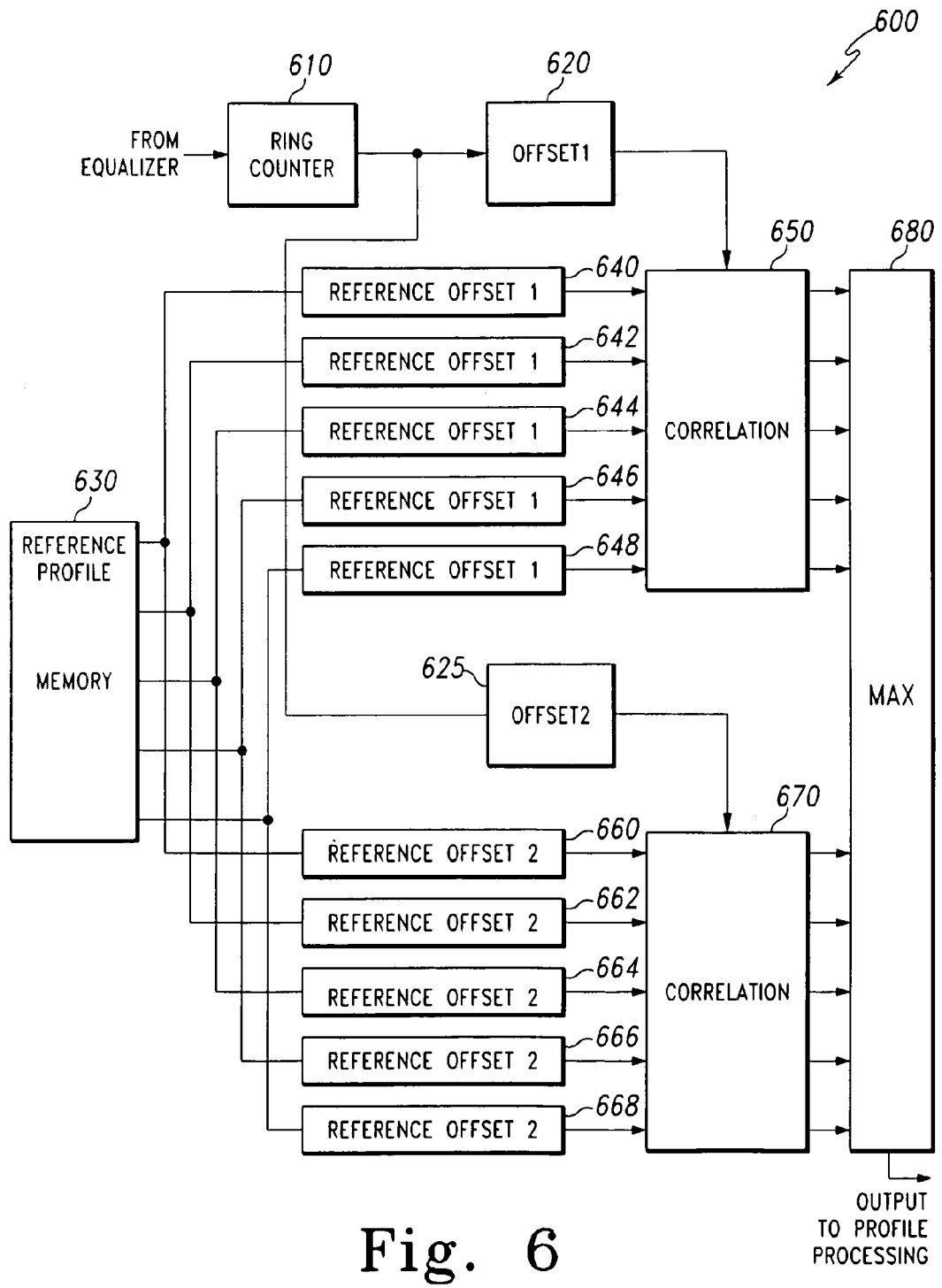
FIG. 6 is a block diagram illustrating another embodiment of a signal format profiler used in a receiver of the present disclosure.

Turning now to FIG. 6, a block diagram of another embodiment of signal format profiler 600 using aspects of the present disclosure is shown. This embodiment is similar to the embodiment shown in FIG. 5, except that it uses a second set of reference profiles, weighted average and offset & gain adjusted reference profiles. An input signal is provided to ring counter 610. The output of ring counter 610 is connected to both an input offset 620 and input offset 625. A reference profile memory 630 provides outputs to a first set of reference offset blocks 640-648 and a second set of reference offset blocks 660-668. The outputs of reference offset blocks 640-648, along with the output of input offset block 620, are connected to correlation block 650. The outputs of reference offset blocks 660-668, along with the output of input offset block 625, are connected correlation block 670. The outputs of correlation block 650 and correlation block 670 are connected to max detection block 680. Except as described below, the operation of the blocks in signal format profiler 600 are the same as those blocks described for signal format profiler 500 in FIG. 5 and will not be described in further detail here.

In signal format profiler 600, the two sets of profiles provided by reference profile memory 630 to reference offset blocks 640-648 and reference offset blocks 660-668 are each optimized for a particular SNR (signal-to-noise ratio). For example, a first SNR may be represent a relatively clean signal while a second SNR may represent a relatively noisy signal. In a preferred embodiment, the reference profiles provided to reference offset blocks 640-648 are characterized at 20 dB SNR, while the reference profiles provided to reference offset blocks 660-668 are characterized at 30 dB SNR. Signal format profiler 600 generates ten correlation values, five each in correlation block 650 and correlation block 670. The best match determined in max detection block 680 indicates the constellation type for the modulation format for the input signal. The best match may also be used as a crude indicator of the input SNR.

It is important to note that signal format profiler 600 requires more circuitry to implement, as well as more overhead to operate, than signal format profiler 500 due to doubling the amount of lookup table storage and an increased amount of calculations and calculation time. By using two sets of reference profiles at two different SNRs, signal format profiler 600 may be able to handle a wider range of input signal operating conditions and therefore provide additional robustness and accuracy. However, signal format profiler 500 may be able to achieve a high level of robustness with only a single set of profiles by operating using an SNR for the reference profiles that is nominally consistent with the signal operating environment. Noisy signals tend to spread out the peaks that are present in the histogram profiles shown in FIG. 4. By choosing an intermediate SNR for the reference profiles, good correlation may be achieved over the entire useful signal operating environment.

Figure 7:
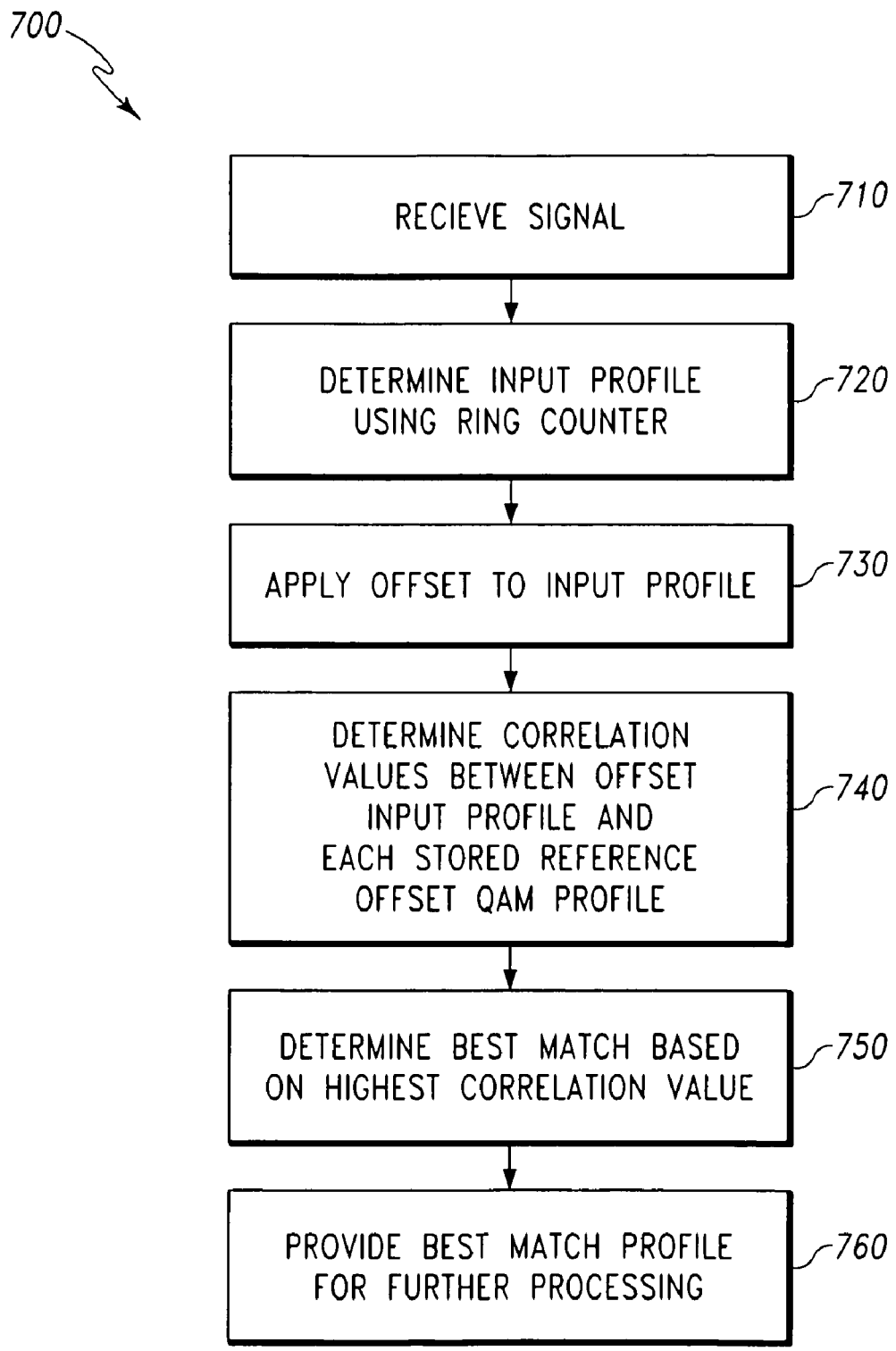
FIG. 7 is a flow chart of an embodiment of a process for determining the modulation format of a signal of the present disclosure.

Turning now to FIG. 7, a flow chart of an embodiment of a process 700 for determining the modulation format of a signal using aspects of the present disclosure is shown. For purposes of example and explanation, the steps of process 700 will be described primarily with reference to signal format profiler 500 in FIG. 5. The steps of process 700 may equally apply to signal format profiler 600 in FIG. 6. The steps of process 700 may be carried out as part of an overall process associated with a receiver circuit, such as receiver 100 shown in FIG. 1. The steps of process 700 may be used to determine the modulation formats for signal from a plurality of signal sources including, but not limited to, transponders in a satellite signal and channels in a cable or terrestrial signal. The steps of process 700 are exemplary only, and are not intended to limit the present disclosure in any manner.

At step 710, a signal stream is received. The received signal stream may be a set of digital samples representing a channel or transponder. The received signal stream may be either fully or partially equalized by an equalizer circuit, such as equalizer 218 described in FIG. 2, but has not been demodulated. Next, at step 720, the received signal stream is window compared. The window comparison at step 720 may use a counting process, such as that implemented by ring counter 510. The window comparison at step 720 may also convert the samples in the received signal stream from vector values to scalar magnitude values. Further, multiple window comparisons may be performed, at step 720, using window comparison segments spanning the value range of the input signal stream. Counter values for the one or more window comparisons may be stored in a memory. The counter values may be used to form a histogram profile of the input signal stream.

At step 730, an adjustment is made to the counter values that form the histogram for the input signal profile by applying an offset to the counter values. An offset may be necessary to adjust the input profile histogram values due to different signal to noise ratios, or some other signal distortion, such as multipath. An offset may be calculated as a weighted average of a set of counter values in signal profiles or histograms from a set of reference profiles as described earlier. The calculated offset may be subtracted from the counter values to form an offset input signal profile. The offset adjustment may improve the results of any comparison to other reference signal profiles in order to determine the modulation format of the received signal.

Next, at step 740, a correlation calculation is performed using the offset input profile and a set of one or more reference profiles. The reference profiles may be stored in a memory such as reference profile memory 430 Also, if necessary, an offset and gain adjustment may be may be performed on the reference profiles in order to improve the correlation calculation at step 740. The offset adjustment may be calculated using an averaging calculation that is equally weighted in terms of weighting between the reference profiles, as described above. However, for certain reference profiles, or for certain signal operating conditions, the offset adjustment may be calculated using averaging that is unequally weighted in terms of weighting between the reference profiles.

At step 750, the correlation results calculated in step 750 are compared and a best match between the input signal profile and one of the reference profiles is chosen. The best match may be the largest value of the correlation calculation determined in step 750. Further, the best match, at step 750, may involve determining the largest correlation value as a result of using a set of reference profiles for more than one received signal operating condition, such a reference profiles for two different SNRs.

Last, at step 760, the best match profile in step 750 is used to determine the modulation format of the signal. The modulation format provides information associated with the constellation type for the signal, such as 16QAM, 32QAM, 64QAM, 128QAM, 256QAM, and the like. The information about the modulation format is important for proper demodulation of the channel or transponder in the received signal. The information about the modulation format may be provided to circuits, such as link circuit 218 described in FIG. 2, for further processing, such as initializing the demodulator. The information may also be stored in a memory and used when later tuning of a particular channel or transponder is desired.

The embodiments in the present disclosure describe an apparatus and method for determining a modulation format of a channel or transponder in a received signal. The modulation format may include information relating to the constellation type, such as 16QAM, 32QAM, 64QAM, 128QAM, 256QAM, and the like, that may improve the performance of a demodulator in a signal receiver if identified prior to the signal demodulation process. The present embodiments determine the modulation format, including the constellation type using a ring counter to create an input signal profile. The input signal profile is compared to reference profiles and a best match to one of the reference profiles is selected. The modulation format and associated information, such as the constellation type or constellation map, is determined based on the selected reference profile. As a result, the modulation format may be determined without actually acquiring signal lock, as well as prior to an attempted demodulation of the signal, in the signal receiver, resulting in improved channel or transponder acquisition and demodulation time.

While the embodiments may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents and alternatives falling within the spirit and scope of the disclosure as defined by the following appended claims.

What is claimed is:

1. A method comprising the steps of:
   receiving a signal;
   comparing a sample of the received signal to a first threshold value and a second threshold value;
   creating a signal profile based on the comparison, the step of creating a signal profile further including creating a histogram using at least two comparisons from the comparison step; and
   selecting a modulation format for the received signal based on the signal profile, wherein the step of selecting includes offsetting a set of values in the histogram based on a weighted average of a set of values for at least two reference histograms.

2. The method of claim 1, wherein the modulation format is at least one of a sixteen level quadrature amplitude modulation (16QAM), thirty two level quadrature amplitude modulation (32QAM), sixty four level quadrature amplitude modulation (64QAM), one hundred twenty eight level quadrature amplitude modulation (128QAM), and two hundred fifty six level quadrature amplitude modulation (256QAM).

3. The method of claim 1, wherein the step of comparing includes comparing a signal level of the sample of the received signal.

4. The method of claim 3, wherein the signal level is a magnitude of the signal level.

5. The method of claim 1, further comprising the step of demodulating the received signal using the selected modulation format.

6. The method of claim 1, wherein the weighted average is an equally weighted average of the set of values for the at least two reference histograms.

7. The method of claim 1, wherein the weighted average is an unequally weighted average of the set of values for the at least two reference histograms.

8. An apparatus comprising:
   means for receiving a signal containing digital samples;
   means for comparing a sample value of the received signal to a first threshold value and a second threshold value;
   means for creating a signal profile based on the comparison, the means for creating a signal profile further including means for creating a histogram using at least two comparisons;
   means for correlating the signal profile against at least two reference profiles; and
   means for selecting a modulation format for the received signal based on the correlation, wherein the means for selecting includes means for offsetting a set of values in the histogram using a weighted average of a set of values for at least two reference profiles.

9. The apparatus of claim 8, wherein the modulation format is at least one of a sixteen level quadrature amplitude modulation (16QAM), thirty two level quadrature amplitude modulation (32QAM), sixty four level quadrature amplitude modulation (64QAM), one hundred twenty eight level quadrature amplitude modulation (128QAM), and two hundred fifty six level quadrature amplitude modulation (256QAM).

10. The apparatus of claim 8, wherein the sample value is a magnitude value of a signal level.

11. The apparatus of claim 8, further comprising means for demodulating the received signal using the selected modulation format.

12. The apparatus of claim 8, wherein the weighted average is an equally weighted average of the set of values for at least two reference profiles.

13. The apparatus of claim 8, wherein the weighted average is an unequally weighted average of the set of values for at least two reference profiles.

14. An apparatus comprising:
- a ring counter that receives a sample of an input signal, compares the sample of the input signal to a first threshold value and a second threshold value, and creates a signal profile for the input signal;
- a signal profiler, coupled to the ring counter, that compares the signal profile for the input signal to at least two reference profiles; and
- a detector, coupled to the signal profiler, that determines a modulation format for the input signal based on the comparison in the signal profiler.

15. The apparatus of claim 14, wherein the modulation format is at least one of a sixteen level quadrature amplitude modulation (16QAM), thirty two level quadrature amplitude modulation (32QAM), sixty four level quadrature amplitude modulation (64QAM), one hundred twenty eight level quadrature amplitude modulation (128QAM), and two hundred fifty six level quadrature amplitude modulation (256QAM).

16. The apparatus of claim 14, further comprising an equalizer coupled to the ring counter, the equalizer adjusting the amplitude and phase of the input signal to compensate for distortion introduced during signal transmission.

17. The apparatus of claim 14, further comprising a demodulator coupled to the detector, the demodulator demodulating the input signal using the modulation format.

18. The apparatus of claim 14, wherein the signal profiler) includes an offset circuit that adjusts the signal profile for the input signal based on a weighted average of at the least two reference profiles.

* * * * *